J. OAKLEY.
BROACH.
APPLICATION FILED JUNE 25, 1918.

1,293,887.

Patented Feb. 11, 1919.
2 SHEETS—SHEET 1.

WITNESS:
A. C. Fairbanks

INVENTOR.
John Oakley,
BY
Frank A. Cutter,
ATTORNEY.

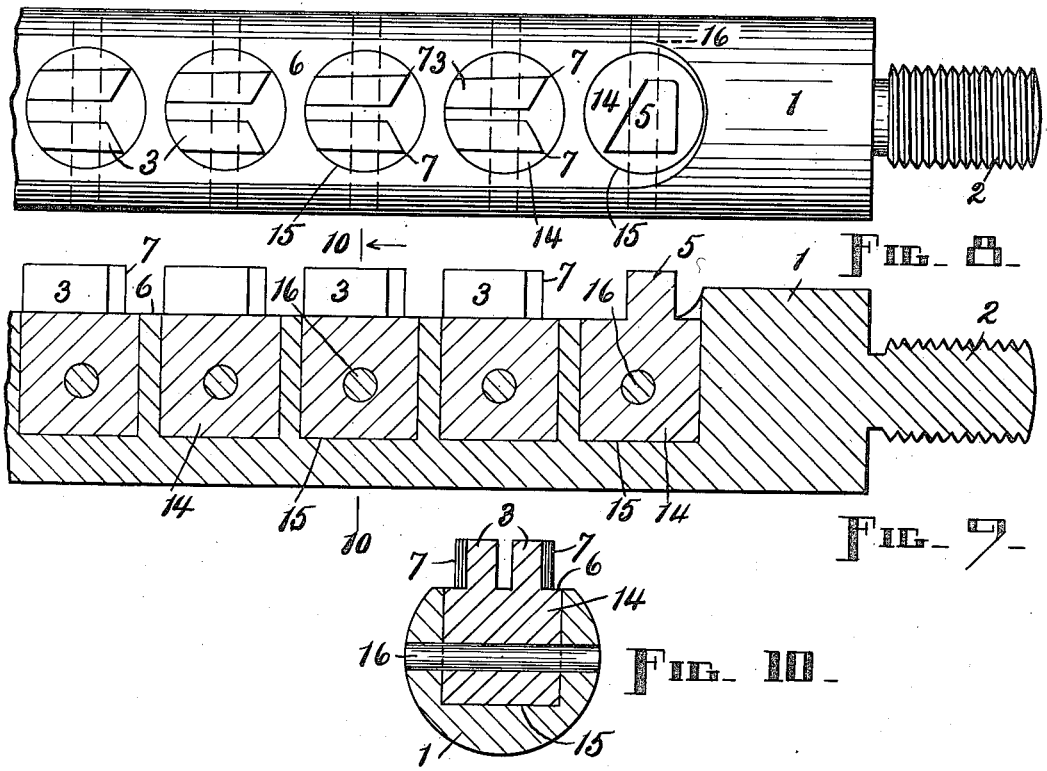
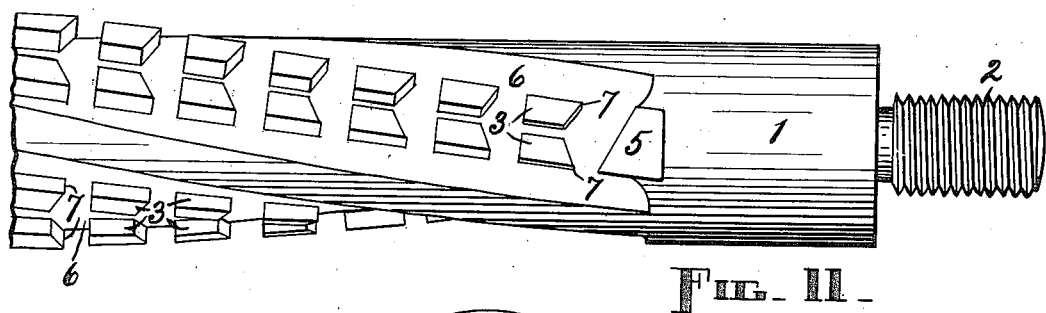
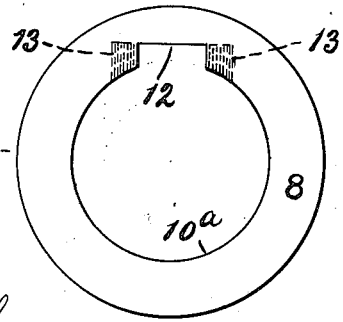

UNITED STATES PATENT OFFICE.

JOHN OAKLEY, OF SPRINGFIELD, MASSACHUSETTS.

BROACH.

1,293,887.   Specification of Letters Patent.   Patented Feb. 11, 1919.

Application filed June 25, 1918. Serial No. 241,749.

*To all whom it may concern:*

Be it known that I, JOHN OAKLEY, a subject of the King of Great Britain, residing at Springfield, in the county of Hampden and State of Massachusetts, United States of America, have invented a new and useful Broach, of which the following is a specification.

My invention relates to improvements in tools of the drift or broach type, which are employed to cut grooves, slots, channels, etc., and consists essentially of a shank provided with certain, peculiar clearance passages, and teeth having lateral cutting edges, such teeth being arranged lengthwise of said shank, with their outermost sides, or the planes of the cutting edges of the teeth, longitudinally of the shank, diverging from front to rear, together with such other elements as may be needed to make the tool complete, all as hereinafter set forth.

The primary object of my invention is to produce a broach for use, when a wide slot is required, in cutting away the sides of a comparatively narrow slot which has been initially cut with a broach provided with the ordinary type of teeth. With this tool I am able to broach a wide slot with great accuracy and high finish, and in much less time than is possible in the old way with the tools commonly employed.

This broach is essentially a widening tool, as appears from the foregoing.

A further object is to provide such a broach with which the slot is widened progressively, so that the tool is saved from undue strain and wear and liability of breaking the teeth avoided or obviated altogether, and, furthermore, chipping, slivering, or tearing the finished portions of the stock, that is, the finished sides of the slot, is prevented.

Another object is to afford ample clearance for the chips cut by the teeth of the broach, which is very necessary, not only in order to prevent clogging of the passage through which the tool operates, but also to prevent the sides of the slot from being injured.

Still another object is to provide the broach with means to start it with the teeth in proper relation to the slot to be widened, and to maintain the proper relation between the tool and the stock, by guiding the teeth in said slot, throughout the entire operation. This means is termed a "pilot".

Other objects and advantages will appear in the course of the following description.

I attain the objects and secure the advantages of my invention by the means illustrated in the accompanying drawings, in which—

Figure 1:
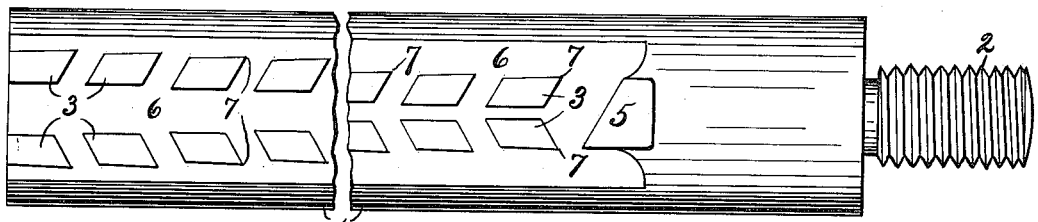
Figure 2:
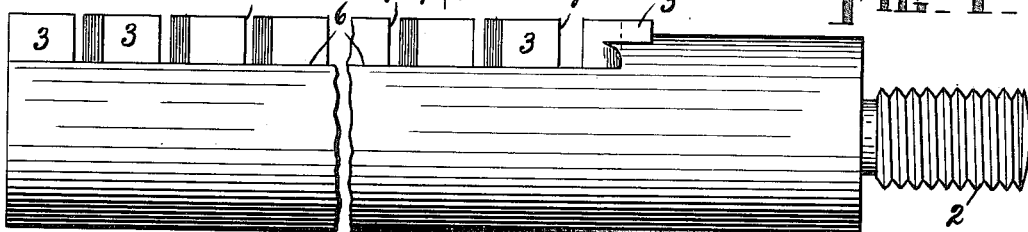
Figure 3:
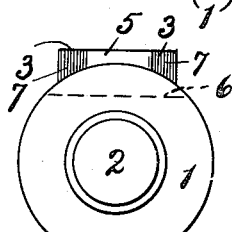
Figure 4:
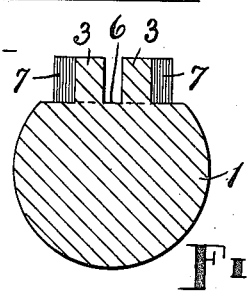
Figure 5:
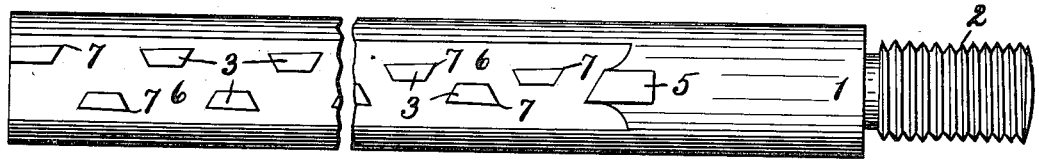
Figure 6:
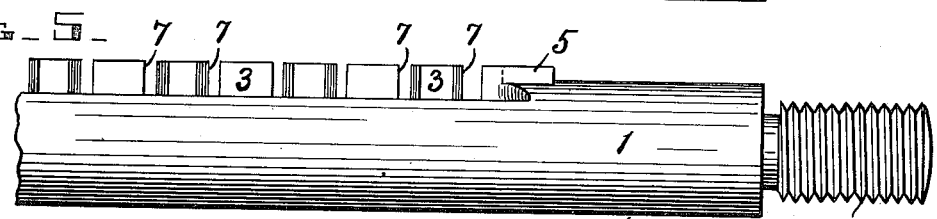
Figure 7:
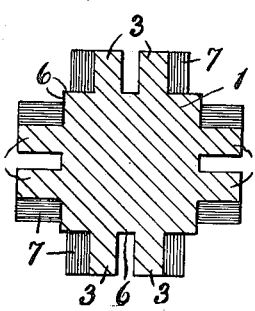

Figure 1 is a top plan of a broach which embodies a practical form of my invention, the middle portion of said broach being broken out to economize space; Fig. 2, a side elevation of said broach, broken out as before; Fig. 3, a front end elevation of said broach; Fig. 4, a cross section through the broach, taken on lines 4—4, looking in the direction of the associated arrow, in Fig. 2; Fig. 5, a top plan of a broach showing another embodiment of said invention, with the middle portion broken out; Fig. 6, a side elevation of the broach shown in Fig. 5, such elevation being of the front end portion only; Fig. 7, a cross section through a broach similar to that shown in the first view, but having a plurality of rows of teeth; Fig. 8, a top plan of a portion of a broach which has inserted, instead of integral as in the other example, teeth elements; Fig. 9, a longitudinal section through the portion of said broach shown in Fig. 8; Fig. 10, a cross section through said broach shown in Fig. 8, on lines 10—10, looking in the direction of the associated arrow, Fig. 9; Fig. 11, a side elevation of a portion of a broach which is similar to that illustrated in the first four views, but with a plurality of spirally arranged rows of teeth, and, Fig. 12, an end elevation of a piece of stock, illustrating the operation or purpose of my widening tool.

Similar reference characters refer to similar parts throughout the several views.

The teeth on the broach of the present invention are arranged in two rows lengthwise of the shank, the teeth being either side by side in regular or uniform order, or in offset or staggered relationship, depending usually on the diameter of the tool. The double rows of teeth may be duplicated one or more times, however, on a tool which is designed to widen more than one slot in a given piece of stock. The teeth are thus divided or split, so to speak, in order to obtain the necessary amount of clearance for the chips, and to this end the shank, which is round in cross section, is usually flattened around the teeth. The double rows of teeth may be spirally arranged on the shank. The teeth elements may be either integral or inserted or attached.

The diameter of the shank of each broach is the same as that of the main passage through the stock, and the radial projection of the leading tooth in a single row, or the leading pair of teeth in a double row, is equal to the depth of the original slot in said stock, but the distance between the cutting edges of said tooth or teeth is a trifle greater than the width of said slot. The distance between the cutting edges of each succeeding tooth in a single row, or of each succeeding pair of teeth in a double row, increases slightly until the rear end of the tool is reached, where the distance between the last pair of cutting edges is the greatest and is equal to the required maximum width of the aforesaid slot. By "pair of teeth" is meant either two teeth which are side by side, or the leading or first tooth and the next following or second tooth, the third and fourth, and so on, accordingly as the teeth be arranged in regular or staggered order in double-row formation. Or, it may be said, a pair of teeth consists of two teeth having cutting edges which are equidistant from a plane central to both rows in which said teeth are located, it being remembered that the cutting edges are on the outer sides of the teeth.

Although I have illustrated and in detail will describe a number of different broaches, all of them embodying my invention, I have by no means exhausted the possible modifications that may be made in said invention without exceeding the scope of what is claimed, wherefore I do not desire or intend to be restricted to the aforesaid broaches.

Referring to the drawings, I will first describe the broach having the double row of regularly arranged teeth, of Figs. 1, 2, 3, and 4, and the modifications shown in Figs. 7 and 11, wherein in each case there is a plurality of double rows and in Fig. 11 said rows are arranged spirally on the shank; then I will describe the broach with the double row of offset or staggered teeth, of Figs. 5 and 6, and, finally, I will take up the inserted-tooth construction of Figs. 8, 9, and 10. But, before proceeding with the several detailed descriptions, I desire to call attention to the fact that each broach comprises a shank 1, which is equipped at the leading or forward end with suitable means for attaching said broach to the machine, as a screw-threaded puller-head 2, a plurality of single cutting-edge teeth 3, and a pilot 5, the latter being ahead of said teeth, and of a height no greater than the depth of the slot to be widened, and of a width equal to that of such slot.

The shank 1 of the first broach is cut away or flattened on one side at 6, and the teeth 3 are arranged on this flattened surface in two rows side by side, their outside front edges constituting cutting edges 7. These cutting edges are on planes which diverge from front to rear. The teeth on this broach are rhomboidal in shape, although this particular shape is not absolutely necessary, and each pair is arranged with the outward flare or indentation at the front end. The pilot 5 is directly in line with the double row of teeth 3, being only a very little narrower than the distance between the two foremost cutting edges 7, and said pilot and teeth project beyond the circumference or major diameter of the shank 1 to the required extent.

Assuming now that a piece of stock 8, Fig. 12, have a central opening or passage $10^a$ and a slot 12 therethrough, which slot it is desired to widen, and that the shank 1 of the first broach will fit said passage and the pilot 5 of said broach will fit said slot, while the spread or amount of separation of the cutting edges 7 of the rearmost teeth 3 of said broach is equal to the required width of said slot, the operation of widening the slot is as follows: The forward end of the shank 1 is introduced into the passage $10^a$ and the pilot 5 into the slot 12, and the tool is drawn forcibly through the slot, with the result that the cutting edges 7 of the teeth 3 progressively cut away both sides of said slot, as indicated by the dotted lines 13 in Fig. 12, and finally leave the slot of the required width.

The pilot leads and the teeth follow and cut the slot wider and wider the farther the tool progresses, as is clearly apparent. The chips cut by the teeth from both sides of the slot pass freely along the flat surface 6, inside of and between said teeth, and finally off at the back end of the tool. The freedom with which this tool clears itself of chips is due largely to the fact that a tooth is provided for each cut on each side of the slot, instead of a tooth for each cut on both sides of the slot, inasmuch as by the former means a central chip passage is provided the entire length of the surface 6. The longitudinal central space between the teeth 3 constantly widens and the longitudinal lateral spaces between said teeth and the adjacent sides of the stock constantly narrow from front to rear, so that the chips, which accumulate as the tool moves forward, find their way from the narrowing spaces, between the ends of the teeth, into the widening space, and do not clog the teeth or interfere with the proper and accurate operation of the tool.

By merely adding as required double rows of teeth 3 to the shank 1, the first broach is made capable of widening more than one slot in a single piece of stock—see Fig. 7. And by arranging the double rows of teeth 3 spirally on the shank 1, the first broach becomes a spiral widening tool—see Fig. 11.

In the event the diameter of the broach required for certain work be too small to permit of the arrangement side by side of the teeth 3 as on the broach just described, the teeth may be arranged in two rows, as before, but in offset relation, as clearly illustrated in Figs. 5 and 6. I am thus able to obtain teeth of the required size and strength, as could not be done even if it were possible to arrange them side by side, owing to the small diameter of the shank. In this construction there is also ample clearance for the chips, which latter pass back outside and inside and between adjacent ends of the teeth 3, very much as they do in the first construction. The flattened surface 6 from which the teeth 3 spring is here present also, and the cutting edges 7 are at the outer front corners of said teeth as is the case with the teeth of the first broach. These cutting edges 7 are arranged, in the manner hereinbefore described, to operate uniformly on both sides of a slot. The pilot 5 in advance of the teeth 3 is provided, such pilot being in width a trifle less than the distance between the cutting edge 7, of the foremost tooth, from the longitudinal center of the double row of teeth, and the distance of the cutting edge 7, of the next succeeding tooth, from such center, added together. In all respects, except the arrangement of the teeth, the second broach is similar in construction to the first broach, and the operation of said second broach is similar to that of the first.

The teeth 3 on the second broach have their front ends shaped like the corresponding ends of the teeth herein first described, the inclination in such case being inwardly and rearwardly from the cutting edges 7 of the teeth, but the opposite ends of said teeth on said second broach incline inwardly and forwardly from the outer sides of said last-named teeth. Chip passages between the ends of the teeth which are similar in both broaches, and passages which facilitate the rearward movement of the chips, are thus obtained.

It is obvious, of course, that the second broach may be provided with more than one double row of teeth, as in the first case; also that the rows of teeth may be spiral.

The teeth 3, instead of being formed integral with the shank 1, may be formed separately and attached to said shank, one or more of such teeth entering into the construction of an attachable unit. One example of the attachable or insertible tooth feature is illustrated in Figs. 8, 9, and 10, wherein each pair of teeth 3 is and the pilot 5 may be formed on a plug 14 which is inserted in a radial opening 15 bored in the shank 1 to receive it, a transverse pin 16 being employed to secure said plug in place. In all other respects this third broach, which, as intimated above, merely serves to show one of many ways for constructing the broach with attachable or insertible teeth, is similar to the first broach.

The principal advantage of insertible teeth is that such teeth when damaged or broken can be taken out and replaced with new ones, instead of being obliged to discard the entire broach; so, also, with regard to the pilot. In the event it were desired to replace any pair of teeth of the third broach, all that is necessary is to drive out the pin 16 which confines the plug 14 upon which said teeth are formed, remove the plug, insert another plug with the required teeth thereon, and secure the same with said pin. The pilot may be replaced in a similar manner.

It is seen that one of the most important and necessary factors in the present invention is the depressed surface, clearance passages around the sides and ends of the teeth, within or inside of the major diameter of the shank, and opening at the rear end of said shank. Without the aforesaid passages, which are here provided or afforded in each case by the flattened surface 6, the tool would be rendered practically useless because of the clogging effect of the chips. In every case the depressed surface, clearance passage is on the surface although within the major diameter of the shank, in contradistinction to longitudinal and lateral, interior bores or passages.

What I claim as my invention, and desire to secure by Letters Patent, is—

1. A broach comprising a shank, and teeth having lateral cutting edges, said shank having depressed surface clearance passages around said teeth, and extending to the rear end of said shank.

2. A broach comprising a shank having a clearance surface within the major diameter thereof, and extending to the rear end of said shank, and teeth extending from such surface and beyond said diameter.

3. A broach comprising a shank having a clearance surface within the major diameter thereof, and extending to the rear end of said shank, and teeth having their bases within the area of such surface and extending beyond said diameter.

4. A broach comprising a shank, and a double row of teeth, said teeth having lateral cutting edges, and said shank having depressed surface clearance passages around said teeth, and extending to the rear end of said shank.

5. A broach comprising a shank, and a pair of longitudinal rows of teeth adapted to cut the sides of a single slot and having lateral cutting edges only in the outside planes of said rows.

6. A broach comprising a shank, and teeth, having lateral cutting edges, arranged in rows longitudinally and spaced apart circumferentially of said shank.

7. A broach comprising a shank, and a pair of longitudinal rows of teeth adapted to cut the sides of a single slot and having lateral cutting edges in the outside planes only of said rows, said planes diverging from front to back.

8. A broach comprising a shank, and teeth, having lateral cutting edges, arranged in rows spaced apart circumferentially of said shank, the planes of said cutting edges diverging from front to rear.

9. A broach comprising a shank, a pair of longitudinal rows of teeth adapted to cut the sides of a single slot and having lateral cutting edges in the outside planes only of said rows, and means to guide said rows into and through a previously formed slot in the stock.

10. A broach comprising a shank, teeth separate from said shank, said teeth having lateral cutting edges, and means to attach said teeth to said shank, the latter having depressed surface clearance passages around said teeth, and extending to the rear end of said shank.

11. A broach comprising a shank, teeth having lateral cutting edges, and a pilot detachable from said shank ahead of said teeth.

12. A broach comprising a shank, teeth attachable to said shank and having lateral cutting edges, and a pilot detachable from said shank ahead of said teeth.

JOHN OAKLEY.

Witnesses:
A. C. FAIRBANKS,
F. A. CUTTER.